(No Model.) 2 Sheets—Sheet 1.

O. C. MUELLER & I. V. WHITEMAN.
AUTOMATIC BRAKE FOR VEHICLES.

No. 576,140. Patented Feb. 2, 1897.

Witnesses
E. H. Monroe

Inventors
Otto C. Mueller
and
Ira V. Whiteman

By their Attorneys,
C. A. Snow & Co.

(No Model.) 2 Sheets—Sheet 2.

O. C. MUELLER & I. V. WHITEMAN.
AUTOMATIC BRAKE FOR VEHICLES.

No. 576,140. Patented Feb. 2, 1897.

Witnesses
E. H. Monroe

Inventors
Otto C. Mueller and
Ira V. Whiteman

By their Attorneys,
C. A. Snow & Co.

UNITED STATES PATENT OFFICE.

OTTO C. MUELLER, OF HENDERSON, AND IRA V. WHITEMAN, OF LAMBERTON, MINNESOTA.

AUTOMATIC BRAKE FOR VEHICLES.

SPECIFICATION forming part of Letters Patent No. 576,140, dated February 2, 1897.

Application filed October 26, 1895. Serial No. 566,998. (No model.)

*To all whom it may concern:*

Be it known that we, OTTO C. MUELLER, residing at Henderson, in the county of Sibley, and IRA V. WHITEMAN, residing at Lamberton, in the county of Redwood, State of Minnesota, citizens of the United States, have invented a new and useful Automatic Brake Mechanism, of which the following is a specification.

Our invention relates to brake mechanism adapted especially for use in connection with vehicles; and the object in view is to provide an automatic brake adapted to be actuated to either retard or release the wheels by the pressure upon the tongue, the same being so constructed as to be readily applied to an ordinary form of vehicle.

Further objects and advantages of this invention will appear in the following description, and the novel features thereof will be particularly pointed out in the appended claims.

Figure 1:
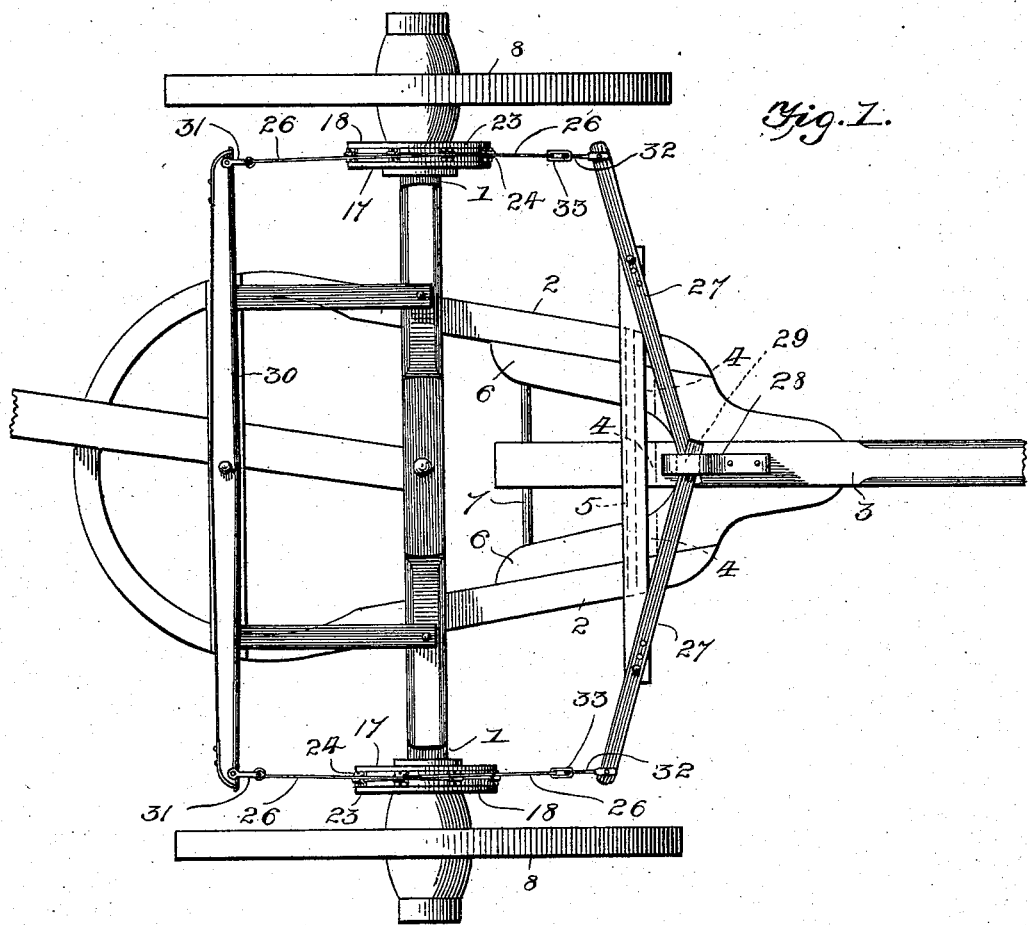
Figure 4:
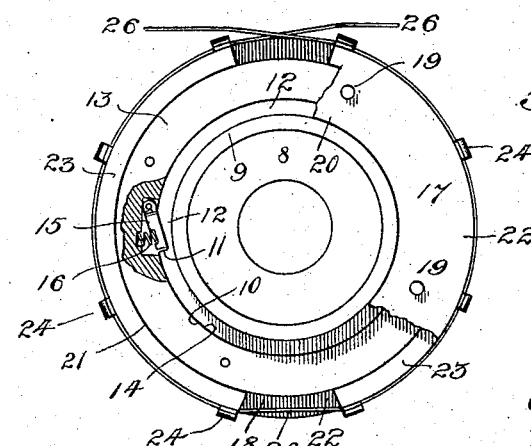
Figure 2:
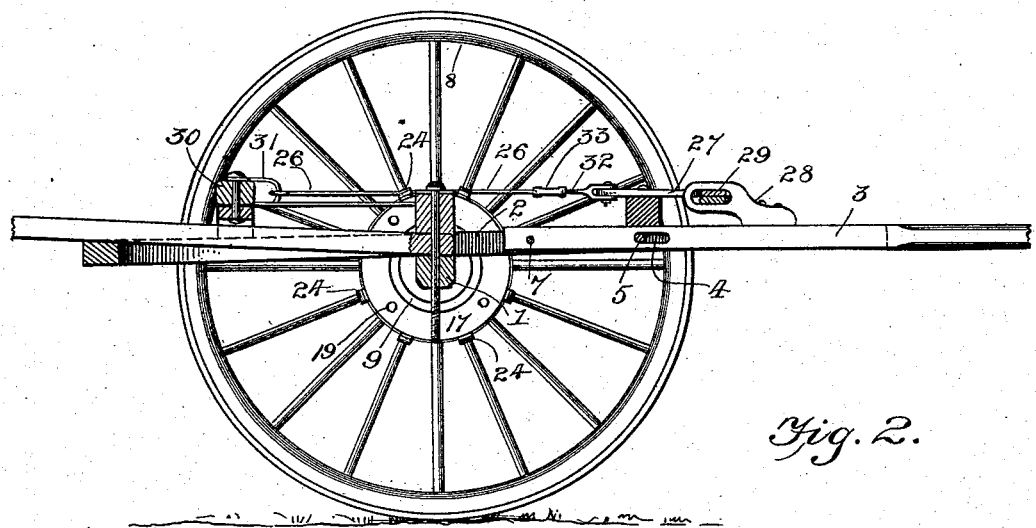
Figure 5:
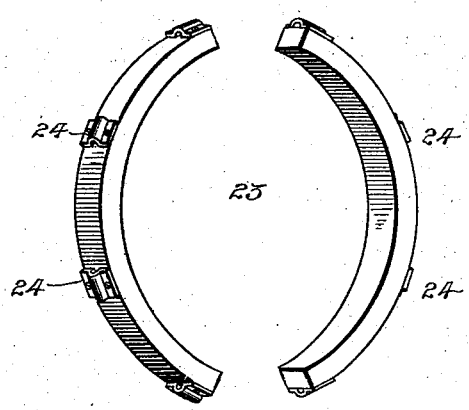
Figure 3:
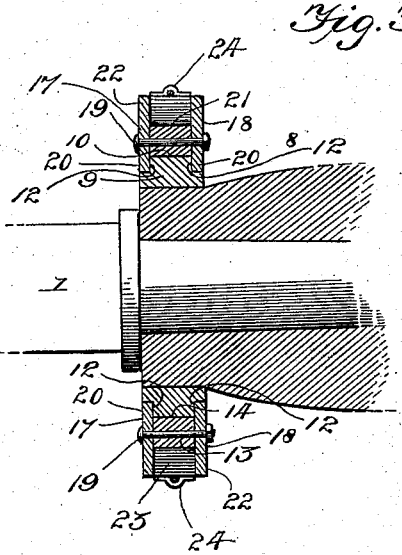

In the drawings, Figure 1 is a plan view of a brake mechanism embodying our invention applied in the operative position to the running-gear of a vehicle. Fig. 2 is a longitudinal central section of the same. Fig. 3 is a transverse section of one of the wheels in the plane of the axis of the spindle. Fig. 4 is an inside view, partly broken away, of the shoe, clutch mechanism, and contiguous parts. Fig. 5 is a detail view of the brake-shoe.

Similar numerals of reference indicate corresponding parts in all the figures of the drawings.

The running-gear to which the brake mechanism embodying our invention is applied may be of any ordinary construction, that shown in the drawings having an axle 1 to uphold the forwardly-projecting hounds 2, supporting the tongue 3. The tongue is pivoted to the hounds for movement in a vertical plane, as in the ordinary construction, but in addition to this pivotal movement the tongue is adapted for a limited longitudinal sliding movement. This additional movement of the tongue is accomplished by a loose pivotal connection secured by longitudinally slotting the tongue, as shown at 4, and extending a fixed horizontal pivot bolt or pin 5 therethrough, said pivot-pin being supported by the hounds. In order to brace the tongue laterally, the hounds are set at a wide interval and the tongue is provided with lateral arms 6, the outer edges of which bear against the inner surfaces of the hounds, and the rear ends of which are secured by interposed connections 7 to the rear extremity of the body portion of the tongue.

Mounted upon the spindles of the axle are the wheels 8, each of which is provided at the inner end of its hub with a fixed clutch member 9 of annular form. This clutch member is provided with a clutch-face 10, having a plurality of ratchet-teeth 11 or other equivalents, and upon opposite sides of said clutch-face with rabbeted seats 12. Mounted upon the fixed clutch member is the loose clutch member 13, also of annular construction, and having a clutch-face 14, which incloses the fixed clutch-face and carries pawls 15 to engage the teeth thereof. These pawls may be spring-actuated, as shown at 16, to insure their engagement with the teeth of the fixed ratchet-face. Said loose clutch member is held in place upon the fixed clutch member by means of annular face-plates 17 and 18, the former of which may be integral with the loose clutch member, while the latter is removable and is secured to the clutch member by means of bolts 19.

The plates 17 and 18 project inward beyond the inner periphery of the loose clutch member to form flanges 20, which are mounted in the rabbeted seats in opposite sides of the fixed clutch member, whereby when the wheel is turned backward or in the direction which it operates in backing the vehicle the fixed clutch member rotates freely within the loose clutch member, and when the wheel is rotated in the opposite direction or forward the loose and fixed clutch members are locked together by the engagement of the pawls with the ratchet-teeth, and the loose clutch member is rotated with the fixed clutch member. The loose clutch member is also provided with a circular outer periphery, forming a shoe-seat 21, said seat being flanged as shown, at 22, and the flanges being formed by the outwardly-projecting edges of the plates 17 and 18, and in this seat is arranged the annular shoe 23, which by contraction upon the shoe-seat is adapted to retard the forward rotation of the loose clutch member, and hence of the wheel. Said shoe is preferably of sectional construction, and in the drawings we have shown the same comprising duplicate approximately semicircular sections provided at intervals upon their outer surfaces with guides or keepers 24, through which extends the continuous flexible connection 26. In the construction illustrated this flexible connection consists of a spring-wire which encircles the shoe to form a turn or wrap, whereby when the extremities of the connection are drawn from each other or in opposite directions said turn or wrap is contracted and thus compresses the shoe sections or members upon the shoe-seat. Spring-wire is employed in this connection for the reason that its inherent resilience, while permitting the shoe sections or members to be drawn firmly against the surfaces of the shoe-seats, is adapted to return it toward its original shape and thus open or spread the turns or wraps and remove the shoe sections or members from contact with the surfaces of the shoe-seats when the strain upon the extremities thereof is diminished or removed.

The connections between the tongue, which is capable of a limited longitudinal movement, and the brake mechanism proper, or the means whereby motion is communicated from said tongue to the flexible connection, may be varied to suit the construction of the vehicle to which the brake is applied, but in the construction illustrated the same consist of operating-levers 27, pivoted at intermediate points to the running-gear in front of the axle and loosely connected at their inner overlapping extremities to the tongue by means of an arm 28, this arm being provided at its rear end with a slot 29, through which the inner overlapping extremities of the levers 27 extend, and an equalizing-bar 30, pivoted at its center to the running-gear in rear of the axle. The portions of the flexible connection in front and in rear of the brake-shoes are connected, respectively, to the extremities of the operating-levers 27 and the equalizing-lever 30, of which the latter is provided at its extremities with clevises 31. In order to take up looseness in the flexible connections, we preferably introduce an adjusting device consisting of a screw 32 and an engaging-swivel 33, said adjusting devices being located contiguous to the point of connection of the front arms of the wire with the extremities of the operative levers.

From the above description it will be seen that backward movement of the tongue caused by the resistance offered by a horse to the forward movement of the vehicle, as in descending a grade, will be communicated through the operating-levers to the front arms of the flexible connections, thus contracting the shoes and causing them to press with greater or less force upon the surface of the shoe-seats, the frictional contact being in proportion to the forward strain exerted by the vehicle or the resistance offered by the backward pressure of the team. Inasmuch as the loose clutch member rotates with the fixed clutch member during the forward movement of the wheels, it will be seen that the resistance offered by the frictional contact of the shoes with the shoe-seats will retard the rotation of the wheels. When, however, it is desired to back the vehicle, in which case the wheels will rotate in the opposite direction, the fixed clutch member rotates freely within the loose clutch member, inasmuch as the clutch members are constructed to engage and lock only when the rotation of the wheels is forward.

Various changes in the form, proportion, and the minor details of construction may be resorted to without departing from the spirit or sacrificing any of the advantages of this invention.

Having described our invention, what we claim is—

1. The combination with operating-levers and means for communicating motion thereto, of brake mechanisms having contractible shoes, a pivotal equalizing-lever, and flexible connections between the extremities of the operating and equalizing levers and encircling said contractible shoes, substantially as specified.

2. The combination with operating-levers and means for communicating motion thereto, of brake mechanisms having contractible shoes, an equalizing-lever, said operating and equalizing levers being arranged, respectively, in advance and in rear of the brake mechanisms, and flexible connections between the extremities of the operating and equalizing levers and encircling said contractible shoes, the flexible connections consisting of continuous wires attached at their front extremities to the ends of the operating-levers, passing around the contractible shoes, and attached at their rear ends to the equalizing-lever, substantially as specified.

3. The combination with a brake mechanism having a contractible annular shoe provided at its outer periphery with a plurality of registering guides, a flexible connection coiled around or encircling said shoe, said connection being of spring-wire and being passed through the registering guides on the shoe, and means for straining or increasing the tension of the connection, substantially as specified.

4. The combination of a fixed clutch member adapted to be secured to a wheel and having parallel side seats and an intermediate clutch-face, a loose clutch member mounted upon said fixed clutch member and provided with inwardly-extending flanges mounted in said seats, said loose clutch member having in its outer side a flanged shoe-seat, a shoe fitting said shoe-seat, and means for contracting the shoe, the loose clutch member having a removable annular side plate to facilitate the dismounting of the same from the fixed clutch member, substantially as specified.

In testimony that we claim the foregoing as our own we have hereto affixed our signatures in the presence of two witnesses.

OTTO C. MUELLER.
IRA V. WHITEMAN.

Witnesses to signature of Otto C. Mueller:
JOHN OLSTALL,
M. MOORE.

Witnesses to signature of I. V. Whiteman:
P. JENY,
R. CKRUSEN.